United States Patent
Isom et al.

(10) Patent No.: US 12,303,903 B2
(45) Date of Patent: May 20, 2025

(54) TEMPERATURE CONTROLLED REACTOR

(71) Applicant: Analytical Sales and Services, Inc., Flanders, NJ (US)

(72) Inventors: David C. Isom, Stockholm, NJ (US); Matthew Dabrowski, Newton, NJ (US)

(73) Assignee: ANALYTICAL SALES AND SERVICES, INC., Flanders, NJ (US)

( * ) Notice: Subject to any disclaimer, the term of this patent is extended or adjusted under 35 U.S.C. 154(b) by 795 days.

(21) Appl. No.: 17/522,580

(22) Filed: Nov. 9, 2021

(65) Prior Publication Data

US 2023/0144595 A1 May 11, 2023

(51) Int. Cl.
*B01L 7/00* (2006.01)
*B01J 19/00* (2006.01)
*B01J 19/24* (2006.01)

(52) U.S. Cl.
CPC ............ *B01L 7/52* (2013.01); *B01J 19/0093* (2013.01); *B01J 19/249* (2013.01); *B01J 2219/00876* (2013.01); *B01J 2219/0095* (2013.01); *B01L 2200/143* (2013.01); *B01L 2300/1883* (2013.01)

(58) Field of Classification Search
CPC .......... B01L 7/52; B01L 2200/143; B01L 2300/1883; B01L 2300/0829; B01L 2300/0854; B01L 2300/185; B01J 19/0093; B01J 19/249; B01J 2219/00876; B01J 2219/0095; B01J 19/0013; B01J 19/004; B01J 19/248

See application file for complete search history.

(56) References Cited

U.S. PATENT DOCUMENTS

| | | | |
|---|---|---|---|
| 5,508,197 A * | 4/1996 | Hansen | C12M 1/36 435/285.1 |
| 6,787,338 B2 | 9/2004 | Wittwer et al. | |
| 8,161,997 B2 | 4/2012 | Höglund et al. | |
| 8,900,854 B2 * | 12/2014 | Takei | C12M 11/00 |
| 9,316,586 B2 | 4/2016 | Maltezos et al. | |

(Continued)

FOREIGN PATENT DOCUMENTS

WO WO-9709353 A1 * 3/1997 .......... B01J 19/0046
WO WO-0061280 A1 * 10/2000 .......... B01J 19/0046

OTHER PUBLICATIONS

SI3-12L Shaking Water Bath, Benchmark Scientific, Dec. 1, 2013.
Build A Reaction Block, J-Kem Scientific, Inc.
MyBlock™ HL Mini DryBath, Benchmark Scientific.

*Primary Examiner* — John McGuirk
(74) *Attorney, Agent, or Firm* — Lawrence B. Goodwin; Mandelbaum Barrett PC

(57) ABSTRACT

A reactor is provided for controlling the temperature of materials undergoing a physical or chemical process. The reactor includes a reactor having a holder adapted to hold a plurality of the materials in a plurality of 2×n arrays, each array having two rows of n materials. The reactor further includes a fluid inlet adapted to receive a temperature-modifying fluid and a fluid outlet adapted to discharge the temperature-modifying fluid. The sample holder has a plurality of fluid flow channels configured such that a fluid flow channel is located adjacent to each of the two rows in each of the plurality of 2×n arrays. The fluid flow channels are adapted to provide substantially equal flow rates and substantially equal fluid flow volumes as the temperature-modifying fluid travels past the arrays.

18 Claims, 4 Drawing Sheets

(56) References Cited

U.S. PATENT DOCUMENTS

| | | | | |
|---|---|---|---|---|
| 2004/0191830 A1* | 9/2004 | Hwang | ................... | B01L 7/525 |
| | | | | 435/6.12 |
| 2008/0286171 A1* | 11/2008 | Diamond | ............. | B01J 19/0046 |
| | | | | 422/600 |
| 2019/0381501 A1* | 12/2019 | Wang | ................. | G01N 35/1079 |

* cited by examiner

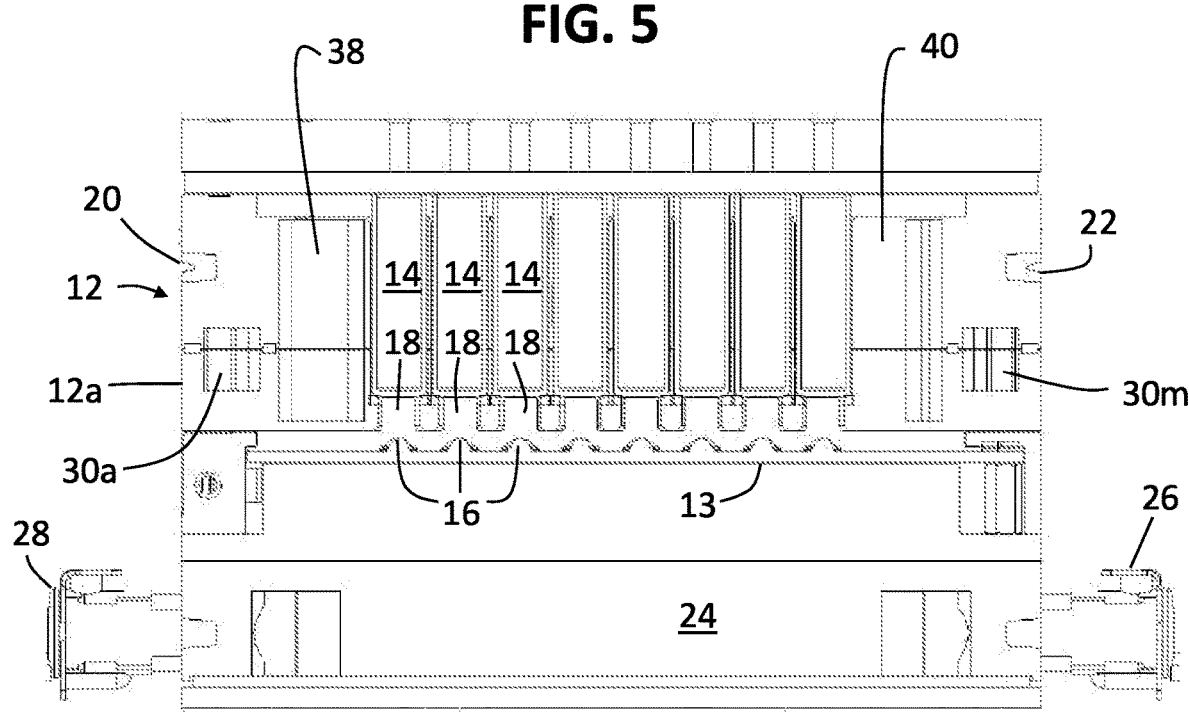
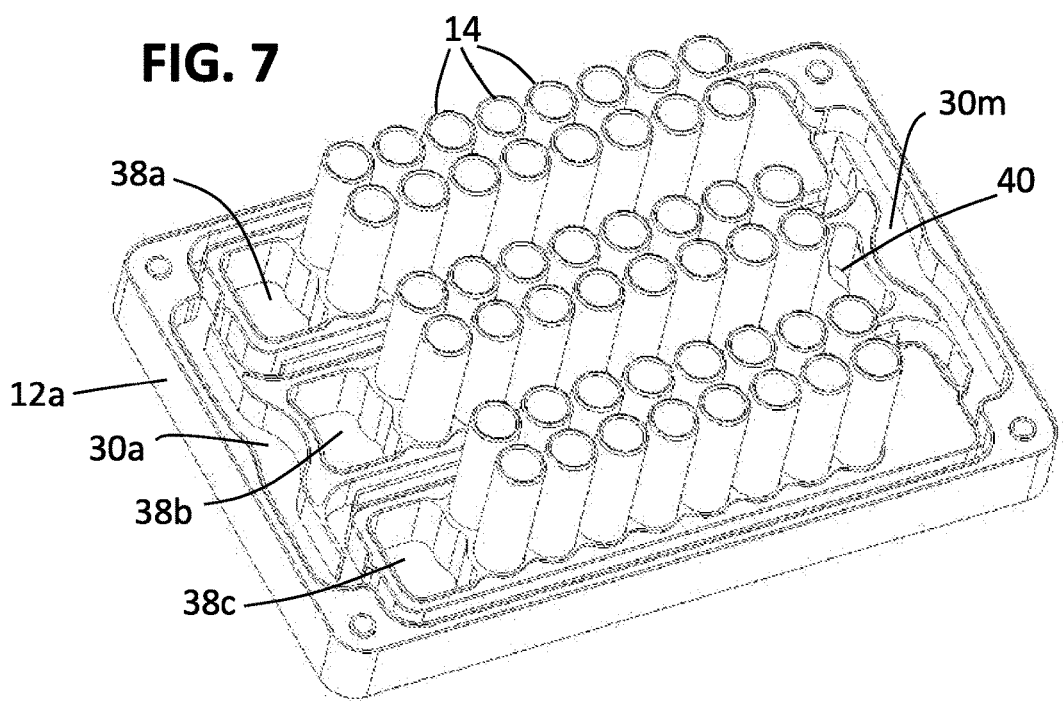

TEMPERATURE CONTROLLED REACTOR

FIELD OF THE INVENTION

The present invention relates to the field temperature control of laboratory reactors, and specifically apparatus for facilitating a substantially uniform temperature profile of samples within such reactors.

BACKGROUND

Laboratory processes, such as measurement, testing and experimentation, often times require precise control of temperatures of samples within a reactor in which the process takes place. Whenever it is required to heat or cool a substance, or to otherwise promote a reaction, temperature control may be required. For example, reactions that are promoted through the application of light may be subject to temperature variations resulting from the heating effects of the light source. In particular, photoredox catalysis is a branch of catalysis that harnesses the energy of light to accelerate a chemical reaction via single-electron transfer events. Photoredox catalysis has become prominent in organic chemistry as a powerful tool for the activation of certain molecules. An apparatus for facilitating photochemical reactions that significantly reduces reaction times is disclosed in U.S. patent application Ser. No. 16/518,560, filed Jul. 22, 2019, now U.S. Pat. No. 11,458,447, assigned to Analytical Sales and Services, Inc., assignee of the present invention.

Photoredox, photocatalysis and photochemistry in general involve the use of a light source, which produces heat which needs to be properly managed so that it does not adversely affect the reactions. More broadly, many other processes, such as testing, measurement and experimentation techniques, either require heating or cooling to promote a reaction, or otherwise produce and/or absorb heat as a byproduct. Examples include

- HTE (High Throughput Experimentation), where multiple (typically 24, 48, 96, 384 or 1536) experiments may be run simultaneously.
- Incubation for, e.g., cell culture work, enzyme preparation (trypsinization), and the like. In vitro work involving the study of live cells is very temperature sensitive. It is important to maintain a precise biologically tolerant temperature to prevent cell death and promote cell growth.
- Automated chemistry. Many newer labs are starting to become equipped with robotic automation equipment that can make various real-time adjustments from light intensity, to sampling times, among other parameters.

These and other techniques require close temperature control to ensure that the samples within the reactor are exposed to known and uniform temperatures. This can be difficult particularly when an array of samples is being processed, as is typically the case, as the temperature from sample to sample may vary, owing to the configuration of the reactor and/or other factors. This lack of temperature uniformity across samples can adversely affect the reliability of the results.

This can be further complicated when endothermic or exothermic reactions occur. For example, in exothermic reactions, the heat released by the reaction itself may increase the reaction rate, potentially sending the reaction out of control or damaging some of the reagents and/or products of the reaction. Further, overheating the reactor may result in a safety hazard. In endothermic reactions, the heat absorbed by the reaction cools the system down, potentially severely slowing the reaction, or potentially damaging some of the components of the reaction, e.g., by freezing.

Thus, maintaining uniform temperatures of the samples, typically contained in reaction vessels such as vials, can be difficult to achieve. In the case of photoredox, photocatalysis and photochemistry, solutions have been developed for cooling of the LED devices themselves, and some solutions have been proposed to cool the reactors as well. However, as of yet, no ideal solution has been proposed which adequately and uniformly maintains temperature of the samples. Utilizing the same cooling devices used for the LED devices is not suitable, owing to poor thermal transfer/conductivity between the LED device and, typically, an aluminum reactor. A large portion of the surface area of the top of the Analytical Sales and Services, Inc.'s "Lumidox" device, for example, consists of a silicone material, which acts as an insulator, leading to very little conductive aluminum-to-aluminum contact. Therefore, other solutions have been explored. For example, solutions have been attempted involving affixing cooling lines to the outside of the reactor, and while this adequately cools the wells located around the perimeter or the reactor, it produces a "heat island" effect where the vials in the center can be as much as 20° C. hotter than those around the perimeter. This technique also violates one of the core requirements of such a solution, which is to maintain the design within the dimensions set forth in ANSI Standard SLAS 1-2004 for Microplate Footprint Dimensions.

Alternatively, simply flowing a fluid, such as, but not limited to, a coolant directly through the reactor would not produce uniform temperature profiles across all samples, as the coolant would pick up heat on its path through the system, resulting in the samples near the outlet being as much as 10° C. hotter than those near the inlet.

SUMMARY OF THE INVENTION

It is therefore an object of the present invention to provide a reactor configuration for facilitating precisely controlled, uniform temperatures across a plurality of substances, materials or samples that are placed in the reactor. For purposes of this description, the terms "substances," "materials," and "samples" will be used interchangeably.

In accordance with a first aspect of the invention, a reactor is provided for controlling the temperature of materials undergoing a physical or chemical process. The reactor includes a reactor having a holder adapted to hold a plurality of the materials in a plurality of 2×n arrays, each array having two rows of n materials. The reactor further includes a fluid inlet adapted to receive a temperature-modifying fluid and a fluid outlet adapted to discharge the temperature-modifying fluid. The sample holder has a plurality of fluid flow channels configured such that a fluid flow channel is located adjacent to each of the two rows in each of the plurality of 2×n arrays. The fluid flow channels are adapted to provide substantially equal flow rates and substantially equal fluid flow volumes as the temperature-modifying fluid travels past the arrays. The sample holder can also be provided with a plurality of inlet-side air chambers, forming air gaps within the reactor, each inlet-side air chamber disposed between the fluid inlet and a respective one of the arrays and adapted to thermally insulate the materials from the temperature-modifying fluid as it is introduced into the fluid inlet. The temperature-modifying fluid can be a cooling fluid adapted to cool the materials, or a heating fluid adapted to heat the materials. The holder can be adapted to hold a plurality of vials in which a respective plurality of the materials is contained.

The reactor can further include an inlet manifold adapted to receive the temperature-modifying fluid and to distribute the fluid to the fluid flow channels, and the inlet-side air chambers can be disposed between the inlet manifold and the arrays. An outlet manifold adapted to collect the temperature-modifying fluid after it has traveled past the arrays and to deliver the temperature-modifying fluid to the fluid outlet, and an outlet-side air chamber disposed between the arrays and the outlet manifold can also be provided.

Preferably, a vertical surface of each of the inlet-side air chambers adjacent to the respective array is configured to substantially follow a portion of the footprint of the respective array adjacent thereto, and a vertical surface of one of the inlet-side air chambers adjacent to the inlet manifold is configured to substantially follow a portion of the footprint of the inlet manifold adjacent thereto. Similarly, a vertical surface of the outlet-side air chamber adjacent to one of the arrays is preferably configured to substantially follow a portion of the footprint of the array adjacent thereto, and a vertical surface of the outlet-side air chamber adjacent to the outlet manifold is configured to substantially follow a portion of the footprint of the outlet manifold adjacent thereto.

The sample holder can advantageously have a footprint that conforms to outer dimensions set forth in ANSI Standard SLAS 1-2004, and vials in positions that conform to ANSI Standard SLAS 4-2004.

In accordance with a second aspect of the invention, a reactor for controlling the temperature of reaction vessels containing materials undergoing a physical or chemical process includes a sample holder adapted to receive a plurality of the reaction vessels in a particular configuration, at least one fluid flow channel, a fluid inlet adapted to receive a temperature-modifying fluid and a fluid outlet adapted to discharge the temperature-modifying fluid, wherein the at least one fluid flow channel is adapted to receive the temperature-modifying fluid from the fluid inlet and to direct the fluid to flow adjacent to each of plurality of the reaction vessels. At least one inlet-side air chamber may also be provided, the at least one fluid flow channel and the at least one air chamber being configured relative to the configuration of the plurality of the reaction vessels such that each of the plurality of reaction vessels is maintained at a uniform, desired temperature.

The at inlet-side air chamber may be disposed between the fluid inlet and the plurality of reaction vessels and includes a vertical surface that is configured to substantially follow a portion of the footprint of at least one of the reaction vessels adjacent thereto. An outlet-side air chamber may also be disposed between the plurality of reaction vessels and the fluid outlet, the outlet-side air chamber including a vertical surface that is configured to substantially follow a portion of the footprint of at least one of the reaction vessels adjacent thereto.

BRIEF DESCRIPTION OF THE DRAWINGS

These and other objects and aspects of the present invention will be described with reference to the following drawing figures, of which:

FIG. 5 is a cross-sectional view of the reactor and Lumidox® LED Array of FIG. 3 (with the external upper inlet and outlet fixtures omitted for clarity);

FIG. 7 is a perspective view of the sample holder of FIG. 6 with vials disposed therein.

DETAILED DESCRIPTION OF THE INVENTION

The present invention maintains and controls the temperature of samples in a reactor to close tolerances by exploiting fluid dynamics and geometric design, with uniformity across all samples maintained to a very high degree. This is achieved by providing cooling (or heating) flow channels, adjusting their configurations relative to the configurations of samples within the reactor, and by providing strategically placed air chambers to alter the heat distribution in the system and maintain well-to-well temperature uniformity, as described below. Although the invention will be discussed in the context of cooling flow channels, it will be appreciated that the same teachings can be employed in reactors that require heating flow channels.

With reference to FIGS. 1-5, the temperature-controlled reactor 12 is configured to enclose and accommodate an array of samples undergoing a chemical reaction for purposes of measurement, testing, processing (e.g., incubation, synthesis), or other processes, where close temperature uniformity and control of each of the samples in the array is required. The reactor 12 is typically machined from aluminum, although other materials may be used, as will be appreciated.

Figure 1:
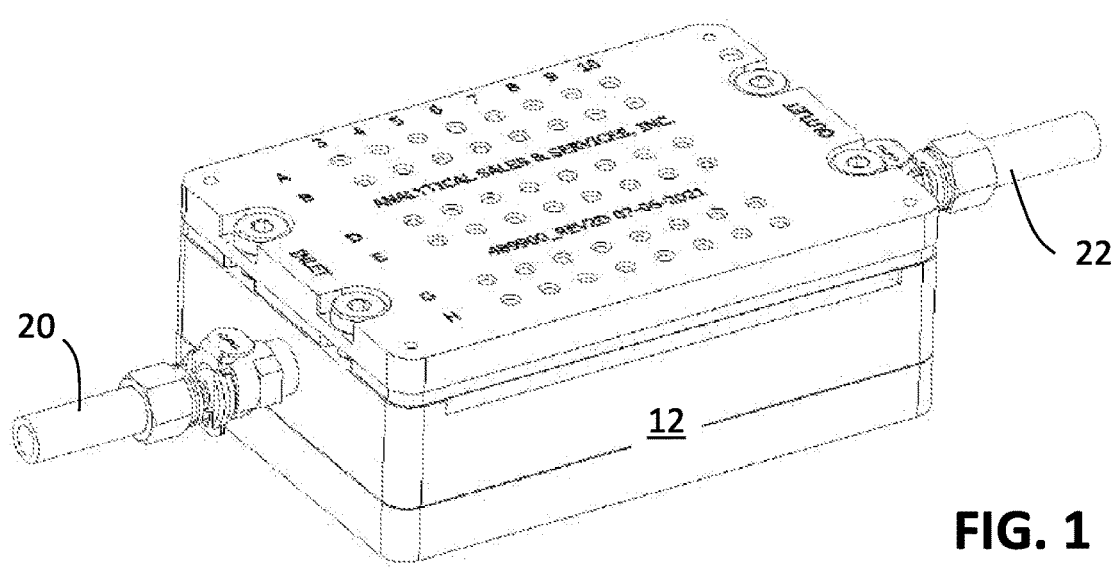
FIG. 1 is a perspective view of an example of a temperature-controlled reactor in accordance with an embodiment of the present invention.
Figure 2:
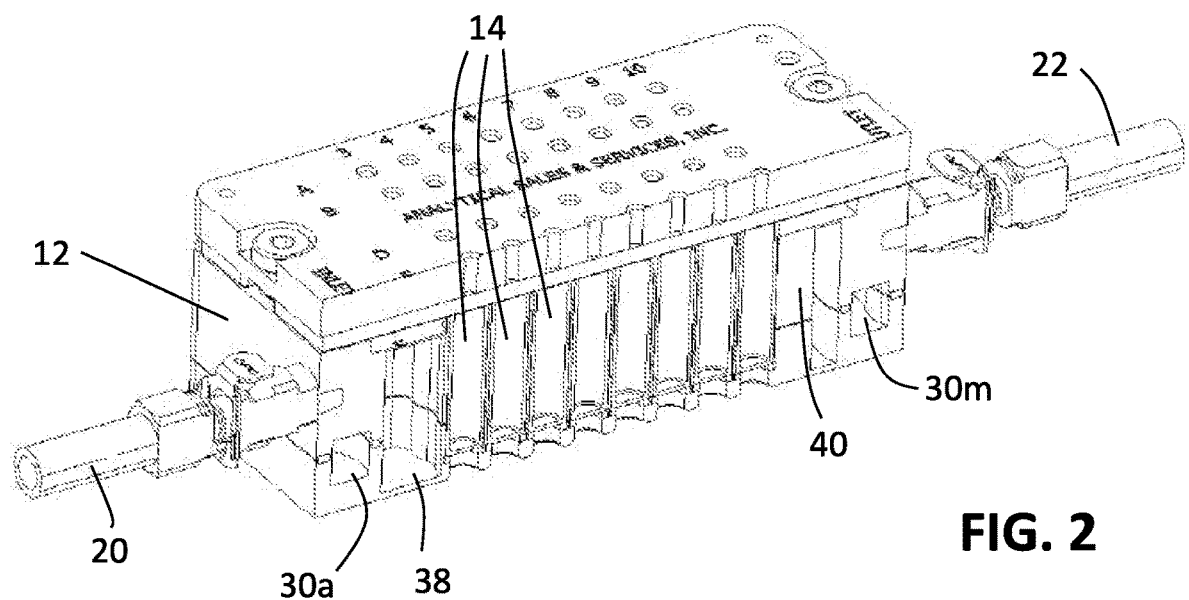
FIG. 2 is a cut-away perspective view of the reactor of FIG. 1 illustrating the internal structure thereof.
Figure 3:
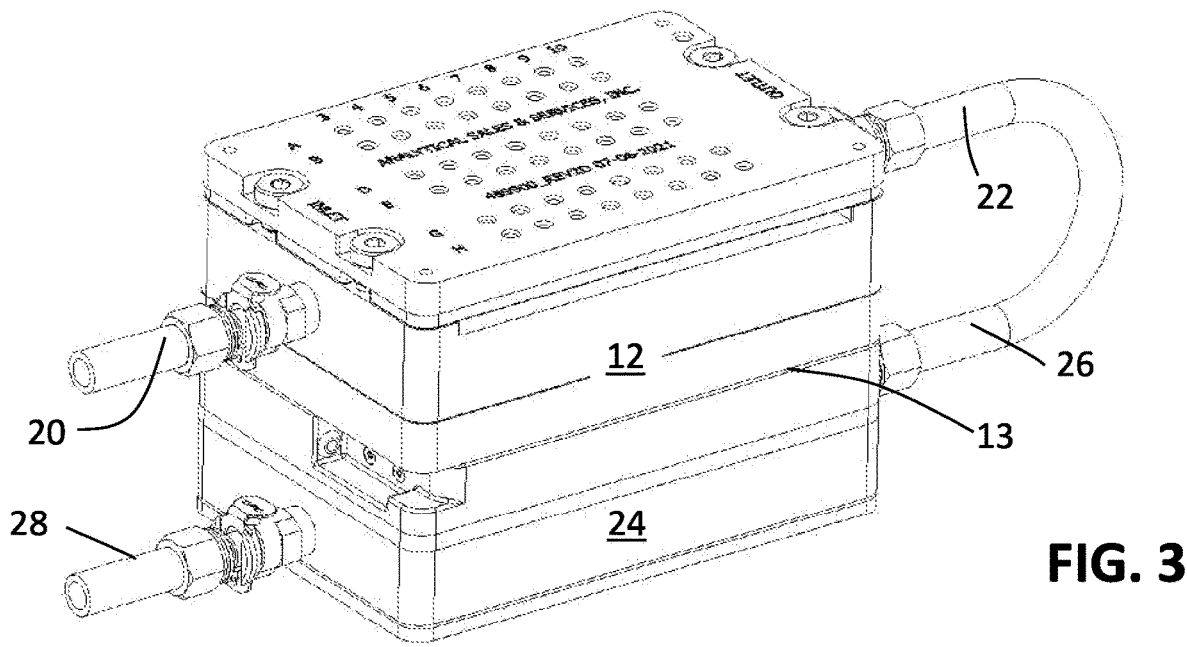
FIG. 3 is a perspective view of an example of a temperature-controlled reactor in accordance with an embodiment of the present invention mounted on a Lumidox® LED Array manufactured by Analytical Sales and Services, Inc.
Figure 4:
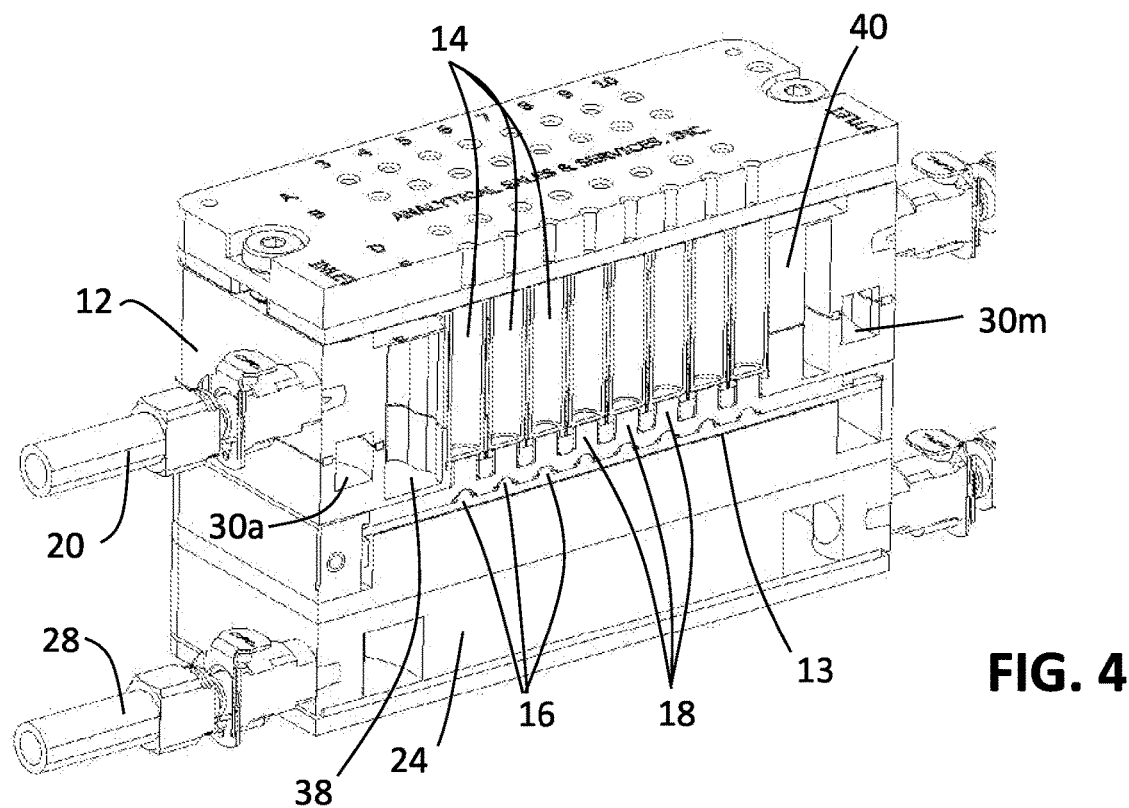
FIG. 4 is a cut-away perspective view of the reactor and Lumidox® LED Array of FIG. 3 illustrating the internal structure thereof.

FIGS. 1-2 illustrate the temperature-controlled reactor in accordance with an example of the present invention, and FIGS. 3-5 illustrate the reactor of FIGS. 1 and 2 mounted on a Lumidox® LED Array, for performing photoredox catalysis and parallel synthesis. The Lumidox® LED Array is manufactured by Analytical Sales and Services, Inc., and is described in co-pending application Ser. No. 16/518,560, now U.S. Pat. No. 11,458,447, the disclosure of which is hereby incorporated by reference. In accordance with the present invention, an array of reaction vessels, in this example, vials 14, is disposed in the reactor 12. When used in conjunction with the Lumidox® LED Array, the vials are disposed on top of a corresponding array of LEDs 16 and a corresponding array of lenses 18. In that example, each of the vials contains a reaction mixture which, when exposed to light from the LEDs, undergoes a chemical reaction, such as photoredox catalysis. The accuracy and precision of the reaction depends, inter alia, on maintaining a predetermined temperature of each reaction mixture. This can be difficult to achieve, as the LEDs produce heat which can adversely affect the reactions. Furthermore, temperature variations from vial-to-vial may also adversely affect the results.

Precise temperature control is achieved through use of the reactor 12, which has an inlet port 20 that receives a cooling (or heating) fluid, and an outlet port 22 that receives the fluid after it travels through the reactor. The fluid then passes to a cooling (or heating) base 24 through inlet port 26 and exits the base 24 through outlet port 28, where it can be applied to apparatus for further temperature control processing and then re-circulated into the reactor via port 20. Although described below in the context of a cooling fluid, it will be appreciated that the invention also applies to situations in which the samples may be heated to effect temperature control over an endothermic reaction, for example.

Figure 6:
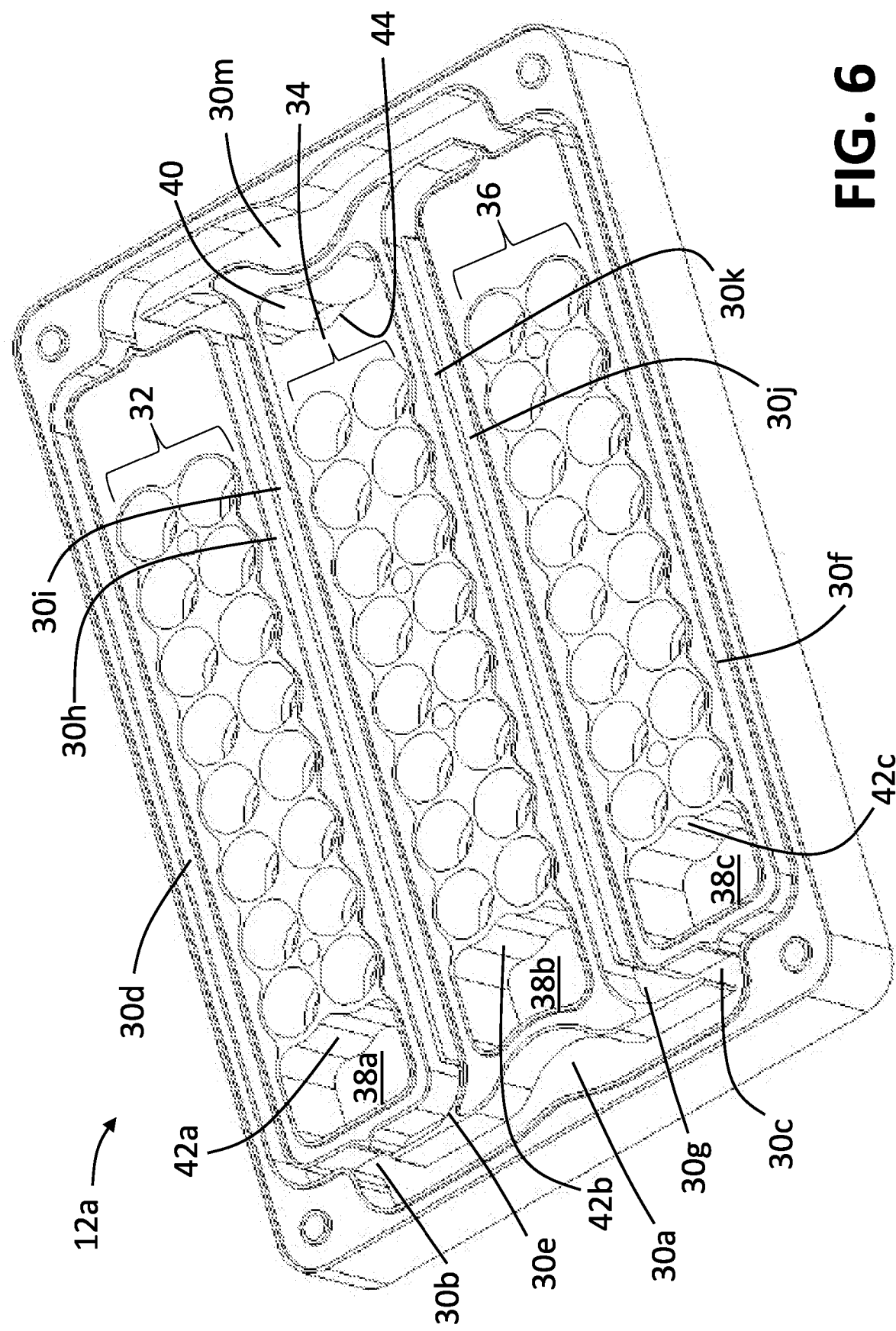
FIG. 6 is a perspective view of an example of a temperature-controlled sample holder in accordance with an embodiment of the present invention.

Upon entering the inlet port 20, the cooling fluid travels into a sample holder 12*a*, FIGS. 5-7, which forms a part of the reactor. As best shown in FIG. 6, the sample holder 12*a* is provided with fluid flow channels 30*a*-30*m*. Cooling fluid entering the reactor at inlet 20 travels vertically downward and arrives at channel 30*a*, which functions as an inlet manifold. Channel 30*a* divides into two dividing channels 30*b* and 30*c*. Each of channels 30*b* and 30*c* further divide into two channels 30*d*/30*e* and 30*f*/30*g*, respectively. Finally, each of channels 30*e* and 30*g* further divide into channels 30*h*/30*i* and 30*j*/30*k*, respectively. The six channels 30*d*, 30*h*, 30*i*, 30*j*, 30*k*, and 30*f* are each designed to direct cooling fluid adjacent to one side of three 2×8 arrays of vials 32, 34 and 36, as shown. After flowing past the arrays, the six channels converge at channel 30*m*, which functions as an outlet manifold, whereupon the fluid travels vertically upward to outlet port 22.

It will be appreciated that the fluid flow channels will be configured differently to accommodate different forms and configurations of reaction vessels, the configuration set forth in FIGS. 6 and 7 being an example of a typical configuration. For example, if only two 2×8 arrays of reaction vessels are used, only four channels will be needed to direct cooling fluid adjacent to each side of the arrays. In general, each array will be a 2×"n" array, in other words, each array will have two rows, so that each row will be immediately adjacent to a flow channel.

To maintain uniform temperature distribution, the flow channels, as shown, are designed in such a way as to promote substantially equal flow rates and substantially equal fluid flow volumes, and to substantially eliminate "dead zones", where fluid is retained for a longer time, as the fluid moves through the system. Generally, the arrays of reaction vessels will be of equal size and configuration, but each array typically will be limited to two rows, such that a fluid flow channel will be adjacent to each row. The flow channels adjacent to each row (channels 30*d*, 30*h*, 30*i*, 30*j*, 30*k*, and 30*f*) will normally be of equal size and cross-section, to ensure equal flow rates and equal fluid flow volumes. The configurations of the manifold 30*a*, and the dividing channels 30*b*, 30*c*, 30*e* and 30*g*, illustrated in FIGS. 4 and 5, eliminate dead zones.

The reactor may preferably be designed so that the vertical height of the fluid flowing through the channels is such that it completely covers the expected level of fluid in each of the reaction vessels, although other vertical heights may be chosen as appropriate.

As noted, the reactor 12 typically will be made of aluminum. Although the use of fluid flow channels helps facilitate the maintenance of uniform temperatures of the reaction vessels, it has been found that the cold fluid entering the reactor from inlet port 20 can overchill the first vials it encounters relative to the vials downstream, closer to outlet port 22. Additionally, at the outlet side, the temperature of the reaction vessels at the center of the reactor may be cooler relative to the outer vessels as a result of the larger volume of fluid at outlet manifold 30*m*. Thus, since air is a better insulator than aluminum, inlet-side air chambers 38*a*, 38*b* and 38*c* are provided between the manifold 30*a* (and associated inlet flow channels 30*b* and 30*c*) and each of the arrays 32, 34 and 36, respectively, and an outlet-side air chamber 40 is provided between array 34 and the outlet manifold 30*m*. The positions and configurations of the air chambers are important in maintaining temperature uniformity of all of the vessels in the reactor.

It was found important to consider the following design guidelines. First, the three inlet-side chambers 38*a*, 38*b* and 38*c* are larger than the outlet-side chamber 40 to thereby insulate the vessels from the initially very cold fluid to the extent possible. Second, to help maintain uniform temperature, the air chambers preferably conform to the existing geometry of the wells and flow channels, while maintaining even aluminum wall thicknesses to ensure the resulting part is structurally sound. In this regard, it is noted that the interior vertical surfaces of the air chambers—i.e., those surfaces facing the interior of the reactor—may be configured to substantially follow the portion of the profile or footprint of the reaction vials that are immediately adjacent, as shown at surfaces 42*a*, 42*b*, 42*c* and 44. Similarly, the interior vertical surfaces of air chambers 38*b* and 40 immediately adjacent to the inlet manifold 30*a* and outlet manifold 30*m*, respectively, may be configured to substantially follow the profile or footprint of the respective manifolds, as shown.

The reactor in accordance with the present invention can be used as a standalone reactor that uniformly and precisely maintains well-to-well temperature. Importantly, a reactor in accordance with present invention can be made to conform to the outer dimensions set forth in ANSI Standard SLAS 1-2004 for Microplate Footprint Dimensions. Further, despite omitting a number of the reaction vessels to accommodate the flow channels, the remaining vessels can be arranged in the correct positions according to a 96-well standard set forth in ANSI SLAS 4-2004 for Microplate Well Positions. Thus, autosamplers and other automated laboratory equipment can use the reactor in accordance with the present invention with little or no reprogramming. The ANSI Standards SLAS 1-2004 and SLAS 4-2004 are hereby incorporated herein by reference.

It will be understood that various additional changes in the details, materials and arrangements of parts which have been herein described and illustrated in order to explain the nature of the invention may be made by those skilled in the art within the principle and scope of the invention as expressed in the following claims.

We claim:

1. Apparatus for controlling the temperature of materials undergoing a physical or chemical process, comprising:
   a) a reactor having a sample holder adapted to hold a plurality of said materials in a plurality of 2×n arrays, each array having two rows of n materials;
   b) said reactor having a fluid inlet adapted to receive a temperature-modifying fluid and a fluid outlet adapted to discharge said temperature-modifying fluid;
   c) said sample holder having a plurality of fluid flow channels configured such that a fluid flow channel is located adjacent to each of said two rows in each of said plurality of 2×n arrays, said fluid flow channels adapted to provide substantially equal flow rates and substantially equal fluid flow volumes as said temperature-modifying fluid travels past said arrays; and
   d) at least one inlet-side air chamber disposed between said fluid inlet and at least one of said arrays and adapted to thermally insulate said materials from said temperature-modifying fluid as it is introduced into said fluid inlet.

2. The apparatus of claim 1 wherein said at least one inlet-side air chamber comprises a plurality of inlet-side air chambers, each inlet-side air chamber disposed between said fluid inlet and a respective one of said arrays and adapted to thermally insulate said materials from said temperature-modifying fluid as it is introduced into said fluid inlet.

3. The apparatus of claim 1 wherein said temperature-modifying fluid is a cooling fluid adapted to cool said materials.

4. The apparatus of claim 1 wherein said temperature-modifying fluid is a heating fluid adapted to heat said materials.

5. The apparatus of claim 1 wherein said holder is adapted to hold a plurality of vials in which a respective plurality of said materials are contained.

6. The apparatus of claim 1 further comprising an inlet manifold adapted to receive said fluid from said temperature-modifying fluid and to distribute said fluid to said fluid flow channels.

7. The apparatus of claim 6 wherein said inlet-side air chambers are disposed between said inlet manifold and said arrays.

8. The apparatus of claim 6 further comprising an outlet manifold adapted to collect said temperature-modifying fluid after it has traveled past said arrays and to deliver said temperature-modifying fluid to said fluid outlet.

9. The apparatus of claim 8 further comprising an outlet-side air chamber disposed between said arrays and said outlet manifold.

10. The apparatus of claim 1 wherein a vertical surface of each of said inlet-side air chambers adjacent to said respective array is configured to substantially follow a portion of the contour of said respective array adjacent thereto.

11. The apparatus of claim 7 wherein a vertical surface of one of said inlet-side air chambers adjacent to said inlet manifold is configured to substantially follow a portion of the contour of said inlet manifold adjacent thereto.

12. The apparatus of claim 9 wherein a vertical surface of said outlet-side air chamber adjacent to one of said arrays is configured to substantially follow a portion of the contour of said array adjacent thereto.

13. The apparatus of claim 9 wherein a vertical surface of said outlet-side air chamber adjacent to said outlet manifold is configured to substantially follow a portion of the contour of said outlet manifold adjacent thereto.

14. The apparatus of claim 5 wherein said sample holder has dimensions that conform to ANSI Standard SLAS 1-2004.

15. The apparatus of claim 14 wherein said sample holder is configured to locate said vials in positions that conform to ANSI Standard SLAS 4-2004.

16. Apparatus for controlling the temperature of reaction vessels containing materials undergoing a physical or chemical process, comprising:
  a) a sample holder adapted to receive a plurality of said reaction vessels in a particular configuration and having at least one fluid flow channel;
  b) a fluid inlet adapted to receive a temperature-modifying fluid and a fluid outlet adapted to discharge said temperature-modifying fluid;
  c) said at least one fluid flow channel adapted to receive said temperature-modifying fluid from said fluid inlet and to direct said fluid to flow adjacent to each of plurality of said reaction vessels;
  d) wherein said at least one fluid flow channel is configured relative to said configuration of said plurality of said reaction vessels such that each of said plurality of reaction vessels is maintained at a uniform, desired temperature; and
  e) at least one inlet-side air chamber disposed between said fluid inlet and said reaction vessels and adapted to thermally insulate said materials from said temperature-modifying fluid as it is introduced into said fluid inlet.

17. The apparatus of claim 16 wherein said inlet-side air chamber includes a vertical surface that is configured to substantially follow a portion of the contour of at least one of said reaction vessels adjacent thereto.

18. The apparatus of claim 16 further comprising an outlet-side air chamber disposed between said plurality of reaction vessels and said fluid outlet, said outlet-side air chamber including a vertical surface that is configured to substantially follow a portion of the contour of at least one of said reaction vessels adjacent thereto.

\* \* \* \* \*